(12) United States Patent
Berlin et al.

(10) Patent No.: US 12,122,084 B2
(45) Date of Patent: *Oct. 22, 2024

(54) METHOD AND TOOL FOR PRODUCING A PLASTIC CONTAINER, PARTICULARLY A FUEL CONTAINER, BY INTERNAL PRESSURE FORMING

(71) Applicant: VOLKSWAGEN AKTIENGESELLSCHAFT, Wolfsburg (DE)

(72) Inventors: Ralf Berlin, OT Wiepke/Gardelegen (DE); Claudia Mientkewitz, Ronnenberg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 547 days.

This patent is subject to a terminal disclaimer.

(21) Appl. No.: 16/982,382

(22) PCT Filed: Mar. 12, 2019

(86) PCT No.: PCT/EP2019/056190
§ 371 (c)(1),
(2) Date: Oct. 16, 2020

(87) PCT Pub. No.: WO2019/179830
PCT Pub. Date: Sep. 26, 2019

(65) Prior Publication Data
US 2023/0191686 A1  Jun. 22, 2023

(30) Foreign Application Priority Data
Mar. 19, 2018 (DE) .......................... 102018204145.8

(51) Int. Cl.
*B29C 49/48*  (2006.01)
*B29C 49/04*  (2006.01)
(Continued)

(52) U.S. Cl.
CPC .......... *B29C 49/4817* (2013.01); *B29C 49/04* (2013.01); *B29C 49/4823* (2013.01);
(Continued)

(58) Field of Classification Search
CPC . B29C 49/4817; B29C 49/4823; B29C 49/50; B29C 2049/4805; B29C 2049/4825
See application file for complete search history.

(56) References Cited

U.S. PATENT DOCUMENTS 6,454,114 B2 * 9/2002 Straetz .................... B29C 65/02
220/4.21
8,763,250 B2 * 7/2014 Zirkelbach ............ F16L 55/033
264/573
(Continued)

FOREIGN PATENT DOCUMENTS

DE          10064801 A1    6/2002
DE     102009030492 A1    1/2011
(Continued)

OTHER PUBLICATIONS

International Search Report corresponding to PCT/EP2019/056190 dated May 20, 2019.

*Primary Examiner* — Russell E Sparks
(74) *Attorney, Agent, or Firm* — Barnes & Thornburg LLP

(57) ABSTRACT

A method for producing a plastic container by internal pressure forming including arranging a hose-shaped preform between the molding dies of a mold, formed having a mold cavity; closing the mold and forming or preforming a container from the preform by internal pressure, wherein a circumferential section of the preform is pressed through a mold gap into a chamber surrounding the mold cavity and is pressed in the chamber against claw pairs having stationary inner retaining claws and movable outer tear-away claws; and laterally moving the outer tear-away claws, causing the
(Continued)

circumferential section between the outer tear-away claws and the inner retaining claws to be torn open and the container to be split into two container halves. Also disclosed is a mold suitable for performing the method.

10 Claims, 3 Drawing Sheets

(51) Int. Cl.
*B29C 49/50* (2006.01)
*B29K 23/00* (2006.01)
*B29L 31/00* (2006.01)

(52) U.S. Cl.
CPC ...... *B29C 49/50* (2013.01); *B29C 2049/4805* (2013.01); *B29C 2049/4825* (2013.01); *B29K 2023/065* (2013.01); *B29L 2031/7172* (2013.01)

(56) References Cited

U.S. PATENT DOCUMENTS

| | | | |
|---|---|---|---|
| 9,073,245 B2* | 7/2015 | Bocker | B29C 49/4247 |
| 11,691,326 B2* | 7/2023 | Mientkewitz | B29C 49/4278 |
| | | | 264/529 |

FOREIGN PATENT DOCUMENTS

| | | |
|---|---|---|
| DE | 102012001928 A1 | 8/2013 |
| DE | 102013203085 A1 | 8/2014 |
| DE | 102017202839 A1 | 8/2018 |
| EP | 1216812 A1 | 6/2002 |
| EP | 2769825 A1 | 8/2014 |

* cited by examiner

METHOD AND TOOL FOR PRODUCING A PLASTIC CONTAINER, PARTICULARLY A FUEL CONTAINER, BY INTERNAL PRESSURE FORMING

PRIORITY CLAIM

This patent application is a U.S. National Phase of International Patent Application No. PCT/EP2019/056190, filed 12 Mar. 2019, which claims priority to German Patent Application No. 10 2018 204 145.8, filed 19 Mar. 2018.

SUMMARY

Illustrative embodiments relate to a method and to a tool for producing a plastic container, in particular, a fuel container, by internal pressure forming, and, in particular, by blow molding.

BRIEF DESCRIPTION OF THE DRAWINGS

Disclosed embodiments are described in more detail with reference to the drawings. The features shown in the figures of the drawing and/or the features explained hereunder can be general features irrespective of specific combinations of features.

DETAILED DESCRIPTION

Figure 1:
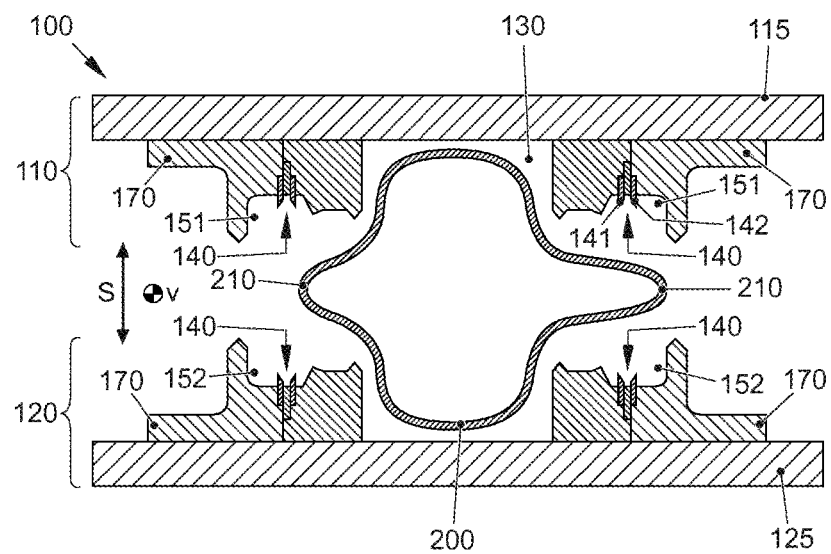
FIG. 1 is a schematic sectional illustration of a first exemplary embodiment of the production of a plastic container.

In blow-molding a heated and, on account thereof viscous, preform of thermoplastic plastics material is inflated with gas, for example, with compressed air, within a shape-imparting blow-molding tool and herein bears on a shape-imparting mold wall, for example, on the internal wall of a mold cavity. After inflation, the hollow body generated by inflating cools in the tool until the hollow body has sufficient dimensional stability and is able to be demolded. In a common variation of the method, a tubular preform which immediately prior thereto can be generated by extrusion is used (so-called extrusion blow molding).

Plastic containers used for transportation vehicles, such as, in particular, fuel containers (fuel tanks), can be produced by blow molding. In some instances, various built-in parts such as, for example, filling level sensors, aeration and ventilation elements, pumps, filters, anti-surge baffle walls, valves, fastening elements and similar have to be disposed in the interior of such a plastic container. Current efforts are aimed at incorporating as many built-in parts as possible, or all built-in parts, into the plastic container already during the production of the latter, this requiring that the interior of the container is accessible.

Possibilities to this end are described in patent documents DE 100 64 801 A1, DE 10 2009 030 492 A1, and DE 10 2012 001 928 A1.

Patent documents DE 10 2013 203 085 A1 and EP 2 769 825 A1 which form the closest prior art describe a blow molding method (and a device) for producing a hollow body, in particular, fuel container, in which a tubular preform is disposed between two parts of a blow mold, the blow mold is not completely closed, wherein the preform in the region of the ends thereof is closed in a gas-tight manner, and the internal region of the preform is impinged with a gaseous pressurizing medium, on account of which the preform is pushed against internal walls of the blow mold parts and the hollow body is premolded. For a simple separation of the preform into two halves to be enabled, it is provided that parts of the preform are gripped by clamping devices which are disposed on the blow mold parts, and the preform is in each case torn into two sub-parts between the clamping devices. The clamping devices have in each case one clamping member which is displaceable in the opening and closing direction of the blow mold parts, and one detent edge which is disposed so as to be opposite the end side of the clamping member, wherein a groove into which material of the preform is pushed in the manner of a bead is formed between the clamping member and the detent edge, and the clamping member or the detent edge is displaced for jamming the material of the preform.

German patent application 10 2017 202 839.4 describes a method and a tool for producing a plastic container by internal pressure forming, in particular, blow molding, a preform which herein is pushed out of the mold cavity and outside the mold cavity is gripped by gripper installations. The gripped portion is torn off on a tearing edge which is disposed outside the mold cavity by laterally displacing the gripper installations, and the molded container herein is divided into two container halves.

Disclosed embodiments provide a method and a device for producing a plastic container by internal pressure forming a tubular preform, the further method and the device not having at least one drawback associated with the prior art, or having the at least one drawback only to a limited extent.

This is achieved by the disclosed method and by the disclosed molding tool (device), the latter being, in particular, a blow molding tool. Disclosed embodiments are derived in an analogous manner from the patent claims, from the description hereunder, and from the drawings. Features of the device or tool, respectively, can thus be associated with corresponding features of the method and vice versa.

The disclosed method comprises at least the following operations which are to be carried out in this sequence:

disposing a tubular preform between the mold parts of an (opened) molding tool configured so as to have a mold cavity;

closing the molding tool (by converging the mold parts in the closing direction) and molding or at least premolding from the preform a container by internal pressure, that is to say by generating an internal pressure in the interior region of the preform using a gaseous pressurizing medium, wherein an encircling portion of the preform is pushed through a mold gap (present, or still present, respectively, between the mold parts) into a chamber that surrounds the mold cavity and in this chamber is pressed against claw pairs having stationary inner holding claws and movable outer tearing claws;

laterally displacing the outer tearing claws, on account of which the encircling portion which is situated outside the mold cavity is torn between the outer tearing claws which are moved, in particular, moved toward the outside, and the stationary inner holding claws, and the container is thus divided into two container halves.

The lateral displacement of the tearing claws takes place when the molding tool is closed. That is to say that the molding tool does not have to be opened for the molded or premolded container to be separated into two container halves. A lateral displacement is understood to mean that the tearing claws are moved transversely to the closing direction, or the closing axis, respectively, of the molding tool, or of the mold parts, respectively. Transversely herein means that the axes of movement of the tearing claws in relation to the closing axis may assume an angle between 45° and 90°, and particularly an angle between 60° and 90°. The tearing claws are moved in a manner substantially perpendicular (90°) to the closing direction. The tearing claws herein are in each case moved toward the outside (laterally toward the outside), that is to say moved away from the mold cavity.

The disclosed method can furthermore have intermediate operations, sub-operations, preparatory operations and/or follow-up operations which are not explained in more detail. The disclosed method may be carried out with the aid of a molding tool, or blow molding tool, respectively, and can therefore comprise the preceding operation:

providing a molding tool or blow molding tool, respectively.

The molding tool used may comprise two mold parts (mold halves, or mold sides, respectively) which are configured so as to have two cavity portions. Claw pairs having inner stationary holding claws (that is to say facing the mold cavity) and outer movable tearing claws (that is to say facing away from the mold cavity) may be disposed about the mold cavity on each of the two mold parts. A claw is a projecting element, that is to say an element which protrudes into the chamber, which is configured as a rake, jaw, blade, or the like, for example. The preform in the respective portion is pressed onto the claws by the internal pressure, wherein a form-fit results (in particular, without any associated perforation), for example, in that the material of the preform is pushed over the claws in the manner of a bead, and tearing forces can hereby be applied to the respective portion. The region which is required for reliable tearing herein can be kept very small. Moreover, no gripping installations or clamping installations are required.

The molding tool in the region between the inner holding claws and the outer tearing claws may be (locally) cooled or heated by temperature-control elements. On account thereof, the material properties of the preform in the respective region can be influenced by targeted cooling or heating such that tearing is facilitated (for example, by way of a brittle fracture or a separation by melting).

For the internal pressure required for the molding of the container to be able to be generated in the tubular preform, the latter, at the axial ends thereof, is closed in a gas-tight manner. The tubular preform can be closed in a gas-tight manner, for example, by welding, when the molding tool is being disposed or closed. A closed preform can however also be provided as a prefabricated initial product. A gas (also air) can already be enclosed in the closed preform, the gas generating an internal pressure which is sufficient for molding the container when the molding tool is closed. The internal pressure may however be generated by injecting a gaseous pressurizing medium into the interior of the closed preform with the aid of at least one blowing mandrel. The container can be substantially completely molded or only premolded herein, depending on the further procedure of the method.

The disclosed method can furthermore comprise the following operations to be carried out in this sequence:

opening the molding tool by diverging the mold parts, wherein each container half remains in the corresponding mold part;

fastening at least one built-in part to at least one of the container halves, in particular, to the internal side of the latter;

closing the molding tool once again by converging the mold parts, wherein the container halves at peripheries, for example, which are hot for melting, reheated, or provided with an adhesive are joined in a materially integral manner so as to form a container, or a container bubble, respectively;

blow-molding the joined container by impinging the internal region of the container with a gaseous pressurizing medium, on account of which the container is pushed against the internal wall of the mold cavity and herein is completely molded, that is to say that the final shape of the container to be produced is achieved on account thereof (the joining and the blow-molding can take place successively, simultaneously, or in the case of corresponding sealing also in the reverse sequence);

optionally trimming the container, in particular, with the aid of an encircling cutting installation of the molding tool;

opening the molding tool and demolding the completed plastic container provided with built-in parts.

The mold parts when closing the molding tool once again for fully molding or completely molding, respectively the container (second closing position) may be converged more tightly than in the previous closing for premolding the container (first closing position).

The disclosed molding tool, wherein this is a blow molding tool, comprises at least the following components:

two mold parts which are configured so as to have a mold cavity and are movable relative to one another;

at least one chamber (outer chamber) which surrounds the mold cavity; and claw pairs which in the chamber are disposed about the mold cavity and which have stationary inner holding claws and movable, or displaceable, respectively, in particular, laterally movable, outer tearing claws which are provided for dividing a previously molded container into two container halves, as has been previously explained.

It is furthermore provided that temperature-control elements for (local) cooling or heating are disposed between the outer tearing claws and the inner holding claws of the claw pairs, as has been described above.

The outer tearing claws can be fastened to slides, in particular, to laterally displaceable or repositionable, respectively, slides which simultaneously laterally delimit (that is to say in a transverse outward manner) the chamber that surrounds the mold cavity. The slides on both mold parts may be disposed as mutually opposite slides, or slide pairs, respectively. The displacement of the slides can be performed by suitable actuating drives, for example, hydraulic cylinders, or else by a cam slide mechanism.

The disclosed molding tool may have a first closing position for premolding the container, and a second closing position in which the mold parts are more tightly converged for fully molding the container. The first closing position and the second closing position can be enabled by dissimilar (lateral) displacement paths of the slides, in particular, so that the opposite slides can assume an inner position (initial position) which enables the first closing position between the mold parts, and at least one outer, mutually offset, position (terminal position) which enables the second closing position between the mold parts.

The blow molding tool 100 which is only schematically illustrated in FIGS. 1 to 6 has two mold parts or mold halves 110 and 120, respectively, which are movable relative to one another and which are configured so as to have a shape-imparting mold cavity 130. Both mold parts 110 and 120 furthermore have slides 170 which are disposed about the mold cavity 130 and which are laterally displaceable, that is to say transversely to the closing direction S. The blow molding tool 100 is installed in a blow molding machine (not shown) in particular, so that the mold parts 110 and 120 are vertically aligned (see reference sign v) such that a tubular preform 200 to be inflated can be introduced from above. By virtue of the vertical alignment v, the mold parts 110 and 120 can also be referred to as mold sides. The production of a fuel container 260, in particular, of a fuel tank or fuel container, respectively, having built-in parts 250 will be described hereunder. The individual operations may be carried out in an automated manner and, in particular, in a fully automated manner.

At the start of the production procedure, the extruded tubular preform 200 at the axial ends thereof may be closed in a gas-tight manner and positioned in the mold cavity 130 between the opened mold parts 110 and 120, as is shown in FIG. 1. The tubular preform 200 is formed from HDPE (high density polyethylene), for example, and is processed in the heated state or in the state still hot for melting. A hollow body is generated from the tubular preform 200 by preliminary blowing, the hollow body being deformed when the blow molding tool 100 is closed by converging the mold parts 110 and 120, wherein an encircling portion 210 of the preform 200 is pushed out of the mold cavity 130 through a mold gap 160 between the mold parts 110 and 120 and into a chamber, or an encircling outer chamber 150, respectively, which fully surrounds the mold cavity 130. The chamber 150 is formed from the sub-chambers 151 and 152 when the mold parts 110 and 120 are converged.

Figure 2:
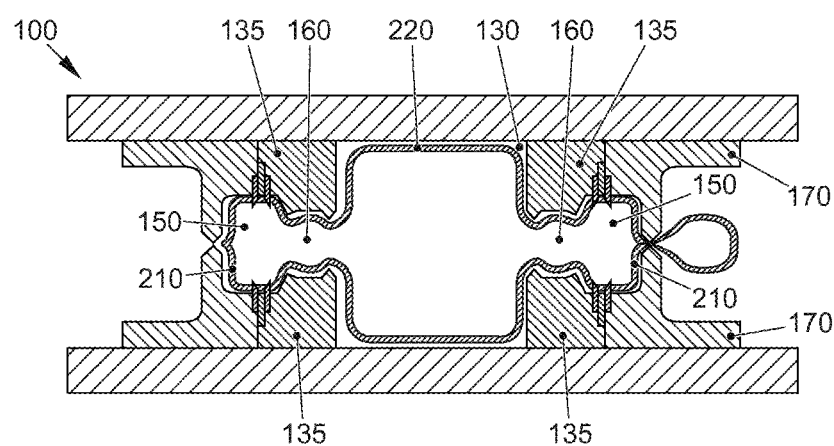
FIG. 2 is a schematic sectional illustration of a second exemplary embodiment of the production of a plastic container.

A potentially projecting external periphery of the preform 200 herein can be jammed between the slides 170, as is shown in FIG. 2, and is squeezed on account of a corresponding exemplary design embodiment of the slides 170.

Once the blow molding tool 100 has been closed and the mold parts 110 and 120 have assumed the first closing position shown in FIG. 2, the preform 200, or the hollow body formed therefrom, respectively, is blow-molded or inflated, respectively, by impinging the internal region of the preform 200 with a gaseous pressurizing medium, for example, compressed air, on account of which the preform 200 is pushed approximately against the internal wall of the mold cavity 130, a container 220 being premolded herein. The encircling portion 210 of the preform 200 that is situated in the chamber 150 herein is also formed by the internal pressure through a mold gap 160 between the mold segments or the wall components 135, respectively, and herein is pressed against claw pairs 140 having inner holding claws 141 and outer tearing claws 142, or is blown onto the claws 141 and 142, respectively. The claws 141 and 142 are disposed laterally about the mold cavity 130 on both mold parts 110 and 120, wherein the inner holding claws 141 (that is to say those facing the mold cavity 130) are stationary, and the outer tearing claws 142 (that is to say those facing away from the mold cavity 130) are movable. The slides 170 form an external mold seal (first sealing plane), which is effective only in this first closing position of the mold, and thus enable a buildup of pressure in the chamber 150.

Figure 3:
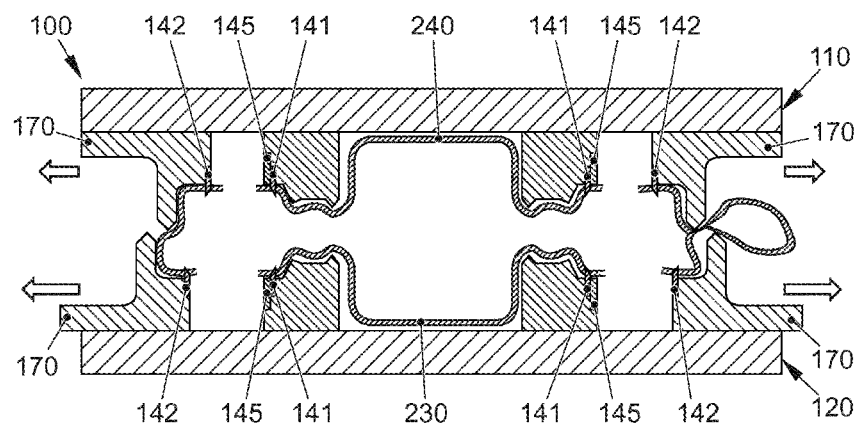
FIG. 3 is a schematic sectional illustration of a third exemplary embodiment of the production of a plastic container.

In the case of a closed blow molding tool 100, in particular, when the internal pressure has been released, the slides 170, proceeding from the inner initial position thereof shown in FIG. 2, are now displaced laterally, that is to say transversely to the closing direction S of the mold parts 110 and 120 (see FIG. 1) and toward the outside, that is to say so as to be directed away from the mold cavity 130, this being highlighted by the arrows in FIG. 3. The slides 170 herein have dissimilar displacement paths, as can be seen from FIG. 3. The portion 210 on both mold parts 110 and 120 herein are torn between the moving outer tearing claws 142 which are connected to the slides 170, and the stationary inner holding claws 141 which are connected to the mold segments 135, on account of which the premolded container 220 is divided into two container halves 230 and 240, without the molding tool 100 being opened herein, that is to say with the molding tool 100 being closed. Temperature-control elements 145 for local cooling or heating are situated between the stationary inner holding claws 141 and the movable outer tearing claws 142, so as to facilitate the tearing action by varying the material properties in a targeted manner, as may be the case.

Figure 4:
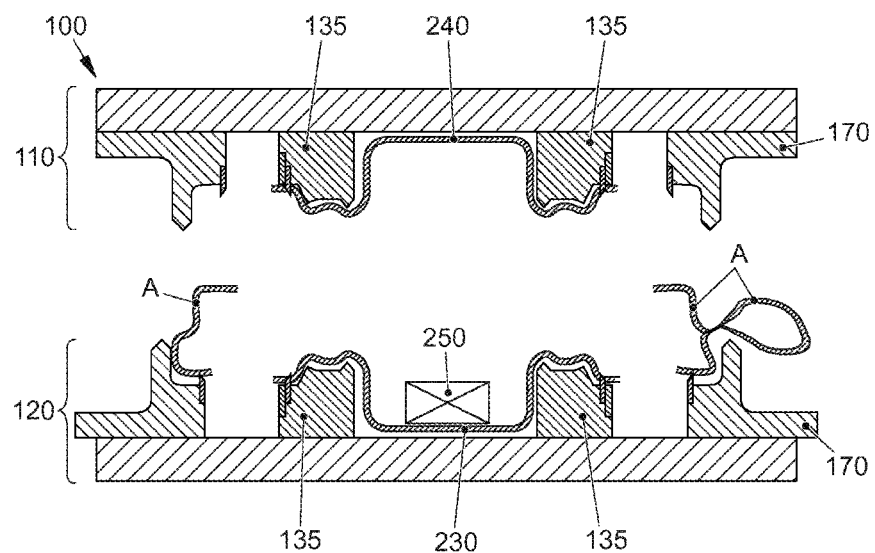
FIG. 4 is a schematic sectional illustration of a fourth exemplary embodiment of the production of a plastic container.

The blow molding tool 100 is then opened, wherein the container halves 230 and 240 remain in the corresponding mold parts 110 and 120, as is shown in FIG. 4. The built-in parts 250 are positioned in the interior of the container which is now accessible, and fixed to at least one internal side. The torn-off waste pieces A can furthermore be removed from the blow molding tool 100.

Figure 5:
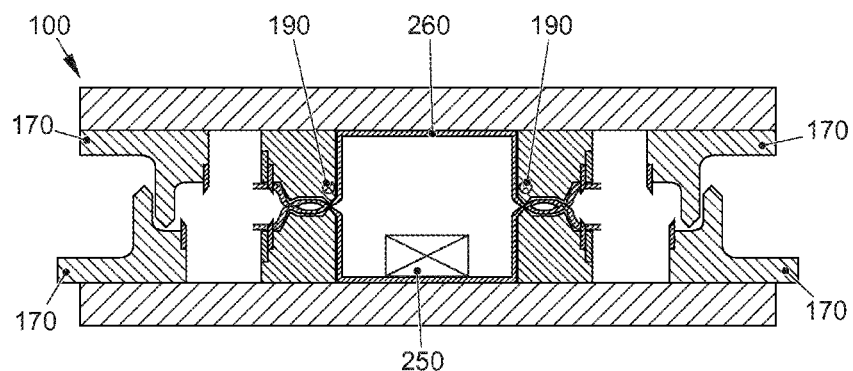
FIG. 5 is a schematic sectional illustration of a fifth exemplary embodiment of the production of a plastic container.

The blow molding tool 100 is now closed once again, wherein the mold parts 110 and 120 assume a second, tighter, closing position, as is shown in FIG. 5. This tighter closing position of the mold is enabled by the slides 170 which are displaced so as to be offset toward the outside. On account thereof, the mold parts 110 and 120 can be further converged, and the mold gap 160 which is still present in the first closing position (see FIGS. 2 and 3) is closed. The mold segments 135 which are still spaced apart in the first closing position now form an inner mold seal (second sealing plane) which is effective only in this second closing position of the mold.

The container halves 230 and 240 are joined to one another in this renewed closing of the blow molding tool 100. To this end, the blow molding tool 100 can have a heating installation 190 by way of which the peripheries of the container halves 230 and 240 that are to be joined can be reheated so as to enable joining in a materially integral and gas-tight manner, wherein other possibilities for heating and/or connecting are also implementable. The container bubble which is now gas-tight is further inflated by impinging the internal region of the gas bubble with a gaseous pressurizing medium, in particular, compressed air, and herein is pushed against the internal wall of the mold cavity 130 so as to follow the shape of the latter, on account of which the two-part container 260 is completely molded.

Figure 6:
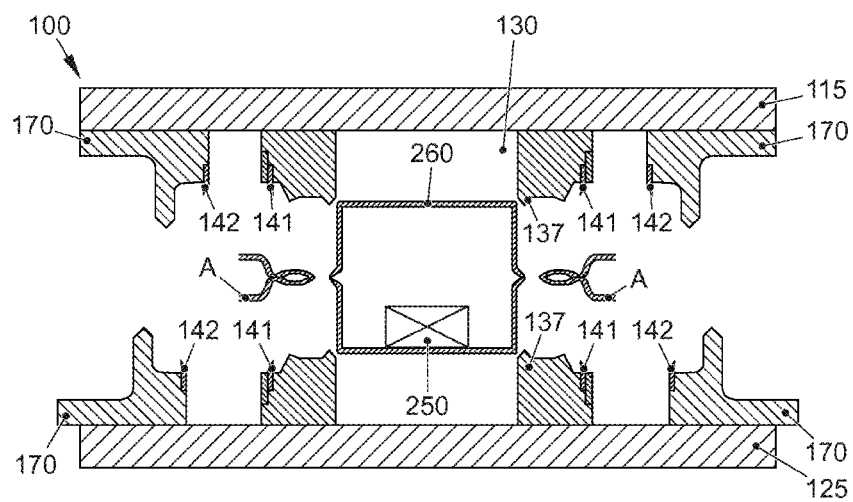
FIG. 6 is a schematic sectional illustration of a sixth exemplary embodiment of the production of a plastic container.

The plastic container 260 produced, having the integrated built-in parts 250, cools in the blow molding tool 100 until the plastic container 260 is sufficiently dimensionally stable and can be demolded after the blow molding tool 100 is opened, as is shown in FIG. 6. In the preceding mold closing procedure (see FIG. 5) the container 260 produced can furthermore be trimmed with the aid of an integrated cutting or trimming installation 137, respectively. For the container 260 and potential waste pieces A to be demolded, the blow molding tool 100 can have ejectors (not shown). For a further container 260 to be produced, the slides 170 are now displaced back to the inner initial position thereof (see FIG. 1).

As an alternative to the approach explained above, it can be provided that the container 260 without premolding is substantially fully molded or completely molded, respectively, already during the first closing of the molding tool 100, is then separated by laterally displacing the tearing claws 142, is opened, is equipped with built-in parts 250, and is joined during the second closing of the molding tool (with or optionally without internal pressure).

LIST OF REFERENCE SIGNS

100 Blow molding tool
110 Mold part
115 Base plate
120 Mold part
125 Base plate
130 Mold cavity
135 Mold segment
137 Cutting installation
140 Claw pair(s)
141 Holding claw
142 Tearing claw
145 Temperature-control element
150 Chamber
151 Sub-chamber
152 Sub-chamber
160 Mold gap
170 Slide
190 Heating installation
200 Preform
210 Portion
220 Container
230 Container half
240 Container half
250 Built-in part(s)
260 Plastic container
A Waste piece
S Closing direction
v Vertical

The invention claimed is:

1. A method for producing a plastic container by internal pressure of a tubular preform and subsequent displacement of components of a molding tool relative to each other thereby to produce two halves of the plastic container, the method comprising:
disposing the tubular preform between two mold parts of the molding tool, the two mold parts being configured to provide a mold cavity that is surrounded by at least one chamber, wherein the two mold parts are movable relative to one another; and
closing the two mold parts of the molding tool to perform molding or pre-molding of the tubular preform to form the container by internal pressure, wherein the tubular preform is disposed between the two mold parts,
wherein a resulting encircling portion of the preform is pushed through a mold gap into the at least one chamber that surrounds the mold cavity, wherein, thereby, in this at least one chamber, the resulting encircling portion is pressed against a plurality of claw pairs that are positioned in the at least one chamber, wherein the claw pairs are disposed about the mold cavity, wherein the plurality of claw pairs include stationary inner holding claws and movable outer tearing claws such that the outer tearing claws are laterally displaced, wherein the lateral displacement of the pair of outer tearing claws is perpendicular to a movement direction of the mold parts, and,
wherein, thereafter, and on account of the lateral displacement of the pair of outer tearing claws, the encircling portion is torn between the pair of outer tearing claws and the pair of inner holding claws, whereby the produced container is divided into two container halves.

2. The method of claim 1, wherein the portion of molding tool between the pair of inner holding claws and the pair of outer tearing claws is cooled or heated by temperature-control elements.

3. The method of claim 1, further comprising:
following production of the two container halves, opening the molding tool, wherein each container half remains in the corresponding mold part;
fastening at least one built-in part to at least one of the two container halves;
subsequently closing the molding tool thereby joining the two container halves, and blow-molding the joined container halves to complete molding of the container;
re-opening the molding tool; and
demolding the produced container.

4. The method of claim 3, wherein, when closing the molding tool for fully molding the container, the mold parts are converged more tightly so as to space the distance between the mold parts closer together than spacing between the mold parts when closing for pre-molding the container.

5. A molding tool configured to produce a plastic container by internal pressure formation of a tubular preform and subsequent displacement of components of the molding tool relative to each other thereby to produce two halves of the plastic container, the molding tool comprising:
two mold parts configured to provide a mold cavity, wherein the two mold parts are movable relative to one another;
at least one chamber which surrounds the mold cavity; and
a plurality of claw pairs positioned in the at least one chamber, wherein the claw pairs are disposed about the mold cavity, wherein the plurality of claw pairs include stationary inner holding claw pairs and movable outer tearing claw pairs,
wherein the tubular preform is disposed between the two mold parts,
wherein, the molding parts of the molding tool close for perform molding or pre-molding of the preform to form the container by internal pressure,
wherein a resulting encircling portion of the preform is pushed through a mold gap into the at least one chamber that surrounds the mold cavity and, thereby, in this chamber, is pressed against the plurality of claw pairs such that the pair of outer tearing claws are laterally displaced, wherein the lateral displacement of the pair of outer tearing claws is perpendicular to a movement direction of the mold parts, and
wherein, thereafter, and on account of the lateral displacement of the pair of outer tearing claws, the encircling portion is torn between the pair of outer tearing claws and the pair of inner holding claws, whereby the produced container is divided into the two container halves.

6. The molding tool of claim 5, wherein the pair of stationary inner holding claws and the pair of movable outer tearing claws are disposed on each of the two mold parts.

7. The molding tool of claim 5, further comprising temperature-control elements disposed between the pair of inner holding claws and the pair of outer tearing claws.

8. The molding tool of claim 5, further comprising slides, to which the pair of outer tearing claws are fastened, wherein the slides simultaneously laterally delimit the chamber.

9. The molding tool of claim 8, wherein the molding tool has a first closing position and a second closing position.

10. The molding tool of claim 9, wherein the first closing position and the second closing position are implemented by dissimilar displacement paths of the slides.

* * * * *